United States Patent
Ganesan et al.

(10) Patent No.: US 10,846,161 B2
(45) Date of Patent: Nov. 24, 2020

(54) APPARATUS AND METHOD FOR MANAGING PART LIFE IN A DATACENTER

(71) Applicant: DELL PRODUCTS, LP, Round Rock, TX (US)

(72) Inventors: Vaideeswaran Ganesan, Bangalore (IN); Pravin Janakiram, Bangalore (IN); Chandrasekhar Revuri, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 196 days.

(21) Appl. No.: 16/045,273

(22) Filed: Jul. 25, 2018

(65) Prior Publication Data

US 2020/0034221 A1 Jan. 30, 2020

(51) Int. Cl.
*G06F 11/00* (2006.01)
*G06F 11/07* (2006.01)

(52) U.S. Cl.
CPC ........ *G06F 11/076* (2013.01); *G06F 11/0709* (2013.01); *G06F 11/079* (2013.01); *G06F 11/0787* (2013.01)

(58) Field of Classification Search
CPC ............... G06F 11/076; G06F 11/0709; G06F 11/0787; G06F 11/079
See application file for complete search history.

(56) References Cited

U.S. PATENT DOCUMENTS

| | | | |
|---|---|---|---|
| 6,892,317 B1 | 5/2005 | Sampath et al. | |
| 7,672,921 B1 | 3/2010 | Clay et al. | |
| 8,275,642 B2 | 9/2012 | Chan et al. | |
| 9,946,981 B2 | 4/2018 | Gatson et al. | |
| 10,585,773 B2 | 3/2020 | Tiwari et al. | |
| 2005/0005186 A1 | 1/2005 | Goebel et al. | |
| 2005/0187744 A1 | 8/2005 | Morrison et al. | |
| 2006/0047479 A1* | 3/2006 | Desai | G06Q 10/06 702/183 |
| 2014/0298113 A1 | 10/2014 | Sakurai et al. | |
| 2014/0301142 A1* | 10/2014 | Stoev | G11C 16/3454 365/185.09 |
| 2015/0003847 A1 | 1/2015 | Yang et al. | |
| 2015/0281015 A1 | 11/2015 | Griffith et al. | |
| 2015/0331775 A1 | 11/2015 | Slik | |
| 2016/0179406 A1* | 6/2016 | Gorobets | G11C 29/70 711/103 |
| 2016/0277260 A1 | 9/2016 | Griffith et al. | |
| 2016/0370416 A1* | 12/2016 | Imfeld | G01R 31/62 |
| 2017/0206510 A1* | 7/2017 | Horton | G06Q 10/20 |

* cited by examiner

*Primary Examiner* — Katherine Lin
(74) *Attorney, Agent, or Firm* — Larson Newman, LLP

(57) ABSTRACT

An information handling system includes a component and a component life manager. The component provides error indications associated with aging of the component, and has a predefined error threshold and a predefined warranty duration. The component life manager receives the error indications, fits the received error indications to a curve, determines an end of life estimate based upon the curve and the error threshold, determines an end of life date based upon the end of life estimate and a date that the first error indication is received, determines a loss of life based on the end of life estimate and the warranty duration, and determines a component life score for the component.

20 Claims, 4 Drawing Sheets

_US 10,846,161 B2_

APPARATUS AND METHOD FOR MANAGING PART LIFE IN A DATACENTER

CROSS REFERENCE TO RELATED APPLICATION

Related subject matter is contained in co-pending U.S. patent application Ser. No. 16/045,326 entitled "Apparatus and Method for Detecting Poor Component Life Zones in a Datacenter," filed Jul. 25, 2018, the disclosure of which is hereby incorporated by reference.

Related subject matter is contained in co-pending U.S. patent application Ser. No. 16/045,334 entitled "Apparatus and Method for Troubleshooting Poor Part Life Zones in a Datacenter," filed Jul. 25, 2018, the disclosure of which is hereby incorporated by reference.

FIELD OF THE DISCLOSURE

This disclosure generally relates to information handling systems, and more particularly relates to managing part life in a datacenter.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may determine a component life score for a component that may provide error indications associated with aging of the component, and may have a predefined error threshold and a predefined warranty duration. A component life manager may receive the error indications, fit the received error indications to a curve, determine an end of life estimate based upon the curve and the error threshold, determine an end of life date based upon the end of life estimate and a date that the first error indication is received, determine a loss of life based on the end of life estimate and the warranty duration, and determine the component life score based upon the loss of life and the warranty duration.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
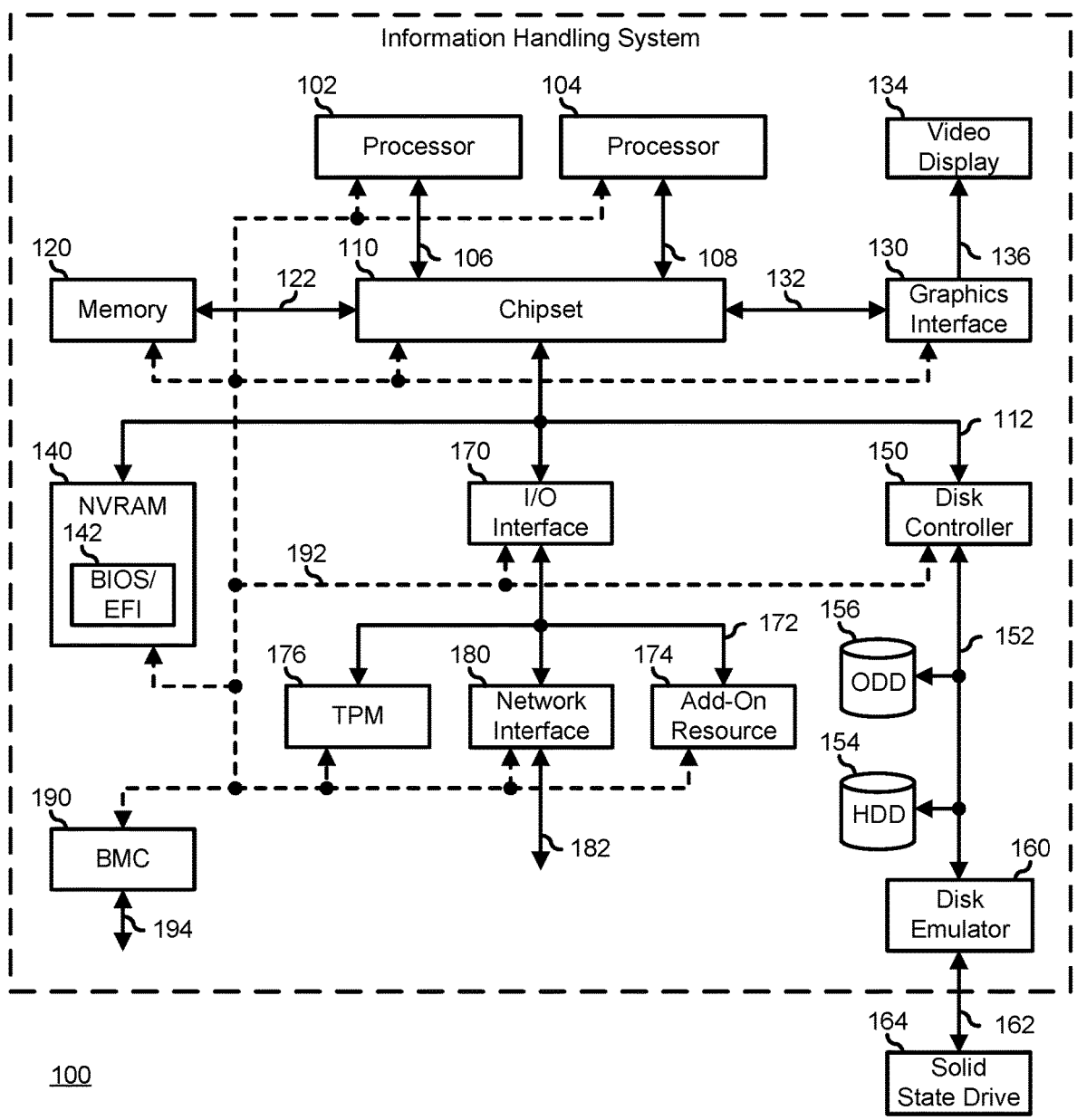
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. An example of network channel 182 includes an InfiniBand channel, a Fibre Channel channel, a Gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (e.g., a Web Services Management (WS-MAN) interface, a Management Component Transport Protocol (MCTP) or, a Redfish interface), various vendor defined interfaces (e.g., a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (e.g., a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Figure 2:
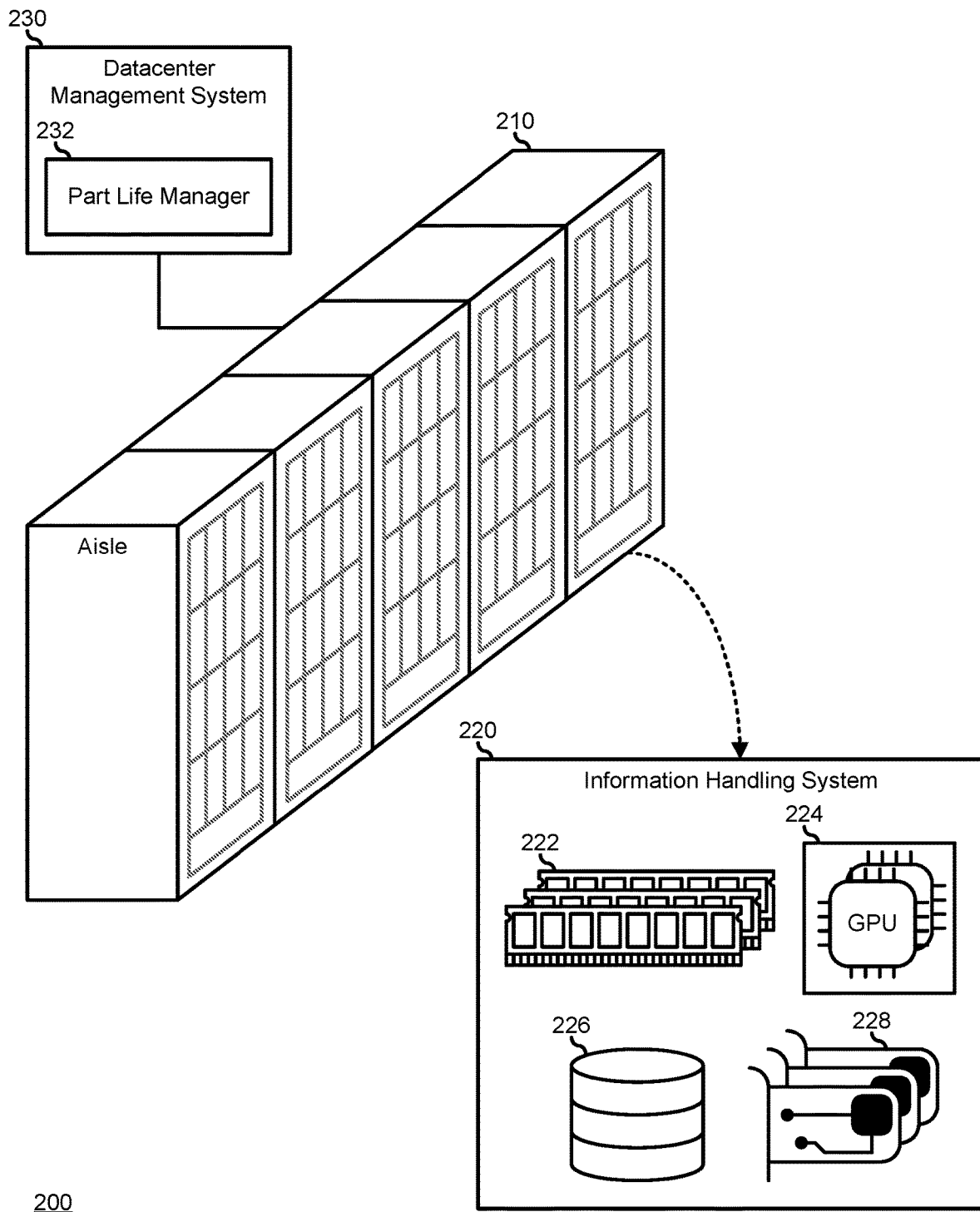
FIG. 2 is a block diagram of a datacenter according to an embodiment of the present disclosure.

FIG. 2 illustrates a datacenter 200 including datacenter aisle 210 and a datacenter management system 230. Aisle 210 includes one or more server racks, each of which is installed with one or more information handling system 220 that are configured to perform the data processing functions of datacenter 200. For example, information handling system 220 may represent a stand-alone server, a blade server, a storage array, a network switch/router, a power supply module, or the like. Information handling system 220 includes various components that are installed into the information handling system, as opposed to components that are assembled onto a circuit board of the information handling system. Such installed components are typically installed into a connector or socket attached to the circuit boards of the information handling system. In some cases, the installed components may be hot-swappable, and information handling system 220 is configured to manage the power to the installed components and to gracefully install, modify, or change drivers associated with the installed components without causing the information handling system to crash. In other cases, information handling system 220 must be powered down prior to changing the installed components, and after the components are changed, the information handling system must be rebooted. Examples of installed components includes Dual In-Line Memory Modules (DIMMs) 222, graphics processing units (GPUs) 224, data storage arrays 226, and network interface cards (NICs) 228.

DIMMs 222 represent data storage devices of information handling system 220 that provide various forms of memory access, such as random access memory (RAM), or non-volatile RAM (NVRAM), and that provide quicker data access than may be provided by data storage arrays 228. DIMMs 222 may be provided on information handling system 220 in accordance with one of the Double Data Rate (DDR) standards, and may include dynamic random access memory (DRAM), static random access memory (SRAM), or various types of non-volatile random access memory (NVRAM) devices, as needed or desired. GPUs 224 represent processing nodes of information handling system 220 that are provided in addition to the one or more main processors of the information handling system, and can be employed in a datacenter environment less for their native ability to process vector data into images in a video frame buffer, but for a more generalized ability of the GPUs to perform highly parallelized tasks in a compute environment, and thus may be seen as processing accelerators that are an adjunct to the processing functions of the information handling system. Storage arrays 226 represent longer term permanent data storage devices of information handling system 220 and may include RAID arrays, stand alone disk drives, Solid State Drives (SSDs), and the like. NICs 228 represent network connectivity devices that connect information handling system 220 to various networks in accordance with a particular network fabric, and can include NICs, host bus adapters (HBAs), and the like.

Installed components allow for flexibility in configuring information handling system 220. In addition, the use of installed components permits the long term maintenance and operation of information handling system 220 beyond the expected lifetime of any particular installed component. For example, a device installed onto a circuit board of information handling system 220 may have a much longer life expectancy than a disk drive or a DIMM. Here, when an installed component fails, the installed component can be replaced without losing the remaining service life of information handling system 220. As such, the installed components are typically configured to provide various failure and error indications that permit information handling system 220 to detect the outright failure or gradual decline in the performance of the installed components.

For example, DIMMs 222 include internal Error Correcting Code (ECC) that permit the DIMMs to detect when data transmitted to and from the DIMMS and internally within the DIMMs experience errors. The details of an ECC scheme is beyond the scope of this disclosure, but it is sufficient for the purposes of this disclosure to understand that a DIMM's ECC mechanism can detect and correct some errors (correctable errors) and can detect but not correct other errors (uncorrectable errors). The event of an uncorrectable error is a catastrophic failure for DIMMs 222, and the detection of an uncorrectable error necessitates the replacement of the failing DIMM and will likely result in loss of data. On the other hand, the event of correctable errors operates to provide an ongoing indication of the health of DIMMs 222, as described further, below. DIMMs 222 operate to provide the uncorrectable error and correctable error information to information handling system 220, for example by hardware signals to a chipset of the information handling system that can be handled by a system BIOS, or by out-of-band communication to a BMC via a SPI bus. GPUs 224 include dynamic page retirement capabilities that permit the GPUs to detect bad memory cells and to gracefully retire the pages that include the bad memory cells. Further, GPUs 224 operate to maintain a count of the number of retired pages to information handling system 220, either to the system BIOS or to the BMC. Storage arrays 226, or, more particularly, the storage drives included in the storage arrays, are configured to provide indications as to the health of the storage drives, including reported uncorrectable errors, uncorrectable sector counts, reallocated sector counts, Input/Output Operations per second (IOPS) limits and current IOPS status, throughput indicators, latency indicators, and the like. NICs 228 are configured to provide indications as to the health of the NICs, including lost packets, BIOS network interface errors, and the like.

Manufacturers of information handling system 220 and of other equipment in datacenter 200 typically design equipment to have a particular service life as indicated by the information handling system or other equipment's warranty duration. In other words, an equipment manufacturer will provide a warranty with a duration that matches the expected longevity of the equipment as a whole, including the components included on the circuit boards and the installed components. However, in operation, conditions at datacenter 200 may lead to accelerated degradation of one or more component of information handling system 220 and of other equipment of the datacenter. Such conditions may include the operating environment, including temperature and humidity, usage profiles of the equipment, workloads performed by the equipment, and the like.

Datacenter management system 230 represents an information handling system that is connected to aisle 210 to monitor, manage, and maintain information handling system 220 and other equipment of datacenter 200. Datacenter management system 230 typically connects to the equipment of datacenter 200 via a dedicated management network between BMCs associated with information handling system 220 and the other equipment, or via a virtual management network established over a main data network of the datacenter. Datacenter management system 230 includes various applications, programs, application program interfaces (APIs), and services that permit a datacenter technician at a remote location to monitor, manage, and maintain the elements of datacenter 200. Datacenter management system 200 includes a part life manager 232 that operates to track failure and error indicators of the installed components of information handling system 220, to analyze trending information related to the failure and error indicators, and to provide life indicators for the installed components that predict when a particular component is likely to fail and should be replaced. Based upon the life indicators, part life manager 232 further operates to provide a part life management score (PLMS) for each component, to roll up the individual component PLMS to identify poor part health zones of the datacenter, to correlate the poor health zones with environmental conditions, usage, and workloads of the components, and to identify risk factors within the datacenter that are contributing to poor component health.

Figure 3:
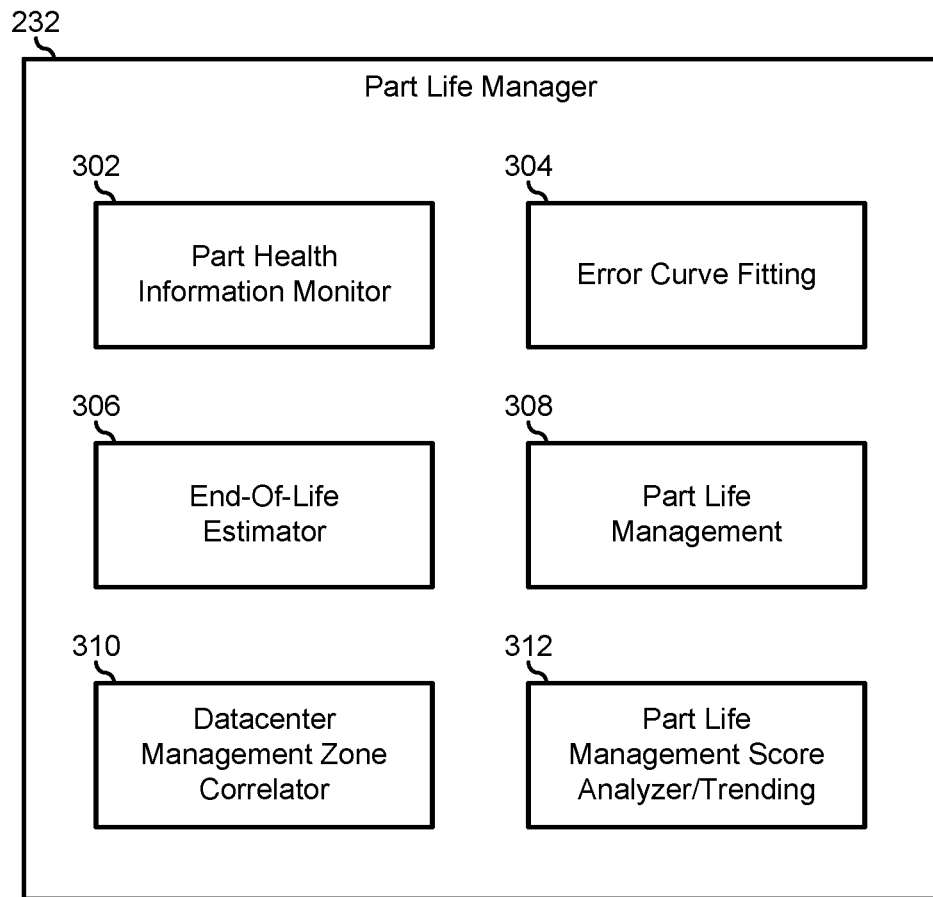
FIG. 3 is a block diagram of a part life manager for the datacenter of FIG. 1.

FIG. 3 illustrates an embodiment of a part life manager 232, including a part health information monitor 302, an error curve fitting module 304, an end-of-life estimator 306, a part life management module 308, a datacenter management zone correlator 310, and a part life management score analyzer 312. As used herein after, a part may be understood to include the installed components of information handling system 220 and of the other equipment of datacenter 200. Further, as used herein after, an error will be understood to include a fault or a failure indication. Part health information monitor 302 operates to receive the errors from each of the parts and to flag when a first error for a given part is received. Error curve fitting module 304 operates for each part to determine when the first error is received, and to continuously generate a best fit curve for each part that mathematically forms a best fit to the received errors for each part. It is generally understood that part life is well predicted by a mathematical equation of the form:

$$\#CE = Ae^{Bt} - C \qquad \text{Equation 1}$$

where #CE represents a number of errors received at a given time t, and where A, B, and C are terms that are derived via a regression of the curve fitting function and that are refined as additional errors are received for the given part. Thus, for each part, error curve fitting module 304 maintains and updates a separate version of Equation 1 that best fits the received error indications for the given part.

End-of-life estimator 306 operates to maintain an error count threshold ($\#CE_{Threshold}$) which represents a number of errors that may be received for a given part or class of parts, before a given part is deemed to be in need of replacement. The error count threshold for any give part or class of parts is determined based upon the experience of the manufacturer of information handling system 220 or of the various parts, and may be seen to ideally correlate to an expected number of errors that may be detected during the warranty lifetime of the given part. That is, a manufacturer of a particular part may determine that a certain number of errors are to be expected in the normal operation of the part during its warranty lifetime. It is implied herein that any errors received above and beyond the error count threshold for a give part are predictors of more and more imminent failure of the given part. End-of-life estimator 306 further receives the currently generated error count equations from error curve fitting module 304, and, substituting in the error count threshold for each part into that part's respective error count equation, determines an end-of-life estimate ($t_{EOL}$). That is, end-of-life estimator 306 operates to solve:

$$t_{EOL} = \frac{\ln\left(\frac{\#CE_{Threshold} - C}{A}\right)}{B} \qquad \text{Equation 2}$$

for each part.

Part life management module 308 receives the end-of-life estimates for each part, determines a projected failure date ($t_{Fail}$), and generates a normalized PLMS for each part. The projected failure date is determined as:

$$t_{Fail} = t_{Error} + t_{EOL} \qquad \text{Equation 3}$$

where $t_{Error}$ is the date of the first detected error for each particular part. In generating the normalized PLMS for each part, part life management module 308 first determines a loss-of-life ($t_{LOL}$) for each part as:

$$t_{LOL} = t_{Warranty} - t_{EOL} \qquad \text{Equation 4}$$

where $t_{Warranty}$ is the warranty duration in days. Part life management module 308 then generates the PLMS for each part as:

$$PLMS = 100 - \frac{t_{LOL} + 100}{t_{Warranty}}. \qquad \text{Equation 5}$$

For example, if the end-of-life estimate is equal to the warranty duration, then, by equation 4, the loss-of-life is equal to zero (0), and, by equation 4, the PLMS is equal to 100, indicating that the particular part is aging as expected to the warranty duration. Further, if the end-of-life estimate is half of the warranty duration, then, by equation 4, the loss-of-life is equal to 50, and, by equation 5, the PLMS is equal to 50, indicating that the particular part is aging more rapidly than expected to the warranty duration. Finally, if the end-of-life estimate is one and a half times the warranty duration, then, by equation 4, the loss-of-life is equal to −50 (negative 50), and, by equation 5, the PLMS is equal to 150, indicating that the particular part is aging more slowly than expected to the warranty duration.

Note that, as error curve fitting module 304 continuously generates updated equations and end-of-life estimator modifies the end-of-life estimates, the PLMS for each part will change, reflecting a current best case prediction for overall part health. In this way, while a rash of early failures would tend to provide a lower than expected PLMS, if such failures were anomalous, the ongoing calculation of PLMS would be expected to become more in line with expectations. Further, an unexpectedly low PLMS for a given part of class of parts may serve to identify problem areas in datacenter 200, as discussed further, below.

For DIMMs 222, part life manager 232 can compute the PLMS for each particular DIMM based upon the received correctable error indications or other error indications as needed or desired. Further, part life manager 232 can maintain an overall DIMM PLMS that is the numerical average of the individual DIMM PLMS. For GPUs 224, part life manager 232 can compute the PLMS for each particular GPU based upon the received dynamic page retirement count or other error indications as needed or desired. For storage arrays 226, part life manager 232 can compute the PLMS for each particular storage drive of a particular storage array based upon one or more of the received reported uncorrectable errors, uncorrectable sectors, and reallocated sectors or other error indications as needed or desired. Further, part life manager 232 can maintain a storage array PLMS for each storage array that is the numerical average of the individual storage drive PLMS, or that is the worst case PLMS of the individual storage drives. Moreover, part life manager 232 can maintain an overall storage array PLMS that is the numerical average of the individual storage array PLMS along with the PLMS for any unassigned, stand-alone storage drives. For NICs 228, part life manager 232 can compute the PLMS for each NIC based upon one or more of the number of packets lost, the number of BIOS network interface errors, or the like.

In addition to being characterized by the various failure and error conditions, the installed components of information handling system 220 may also provide performance measurements, such as where a storage drive of drive arrays 226 meet a particular IOPS, throughput, or latency performance. Here, part life management module 308 operates to determine a performance PLMS based upon the actual usage of the drive as it relates to the specified performance characteristic. As such, part life management module 308 determines an performance loss-of-life ($P_{LOL}$) for each part as:

$$P_{LOL} = P_{Specified} - P_{Actual} \qquad \text{Equation 6}$$

where $P_{Specified}$ is the specified performance and $P_{Actual}$ is the actual amount of work performed by the part. Part life management module 308 then generates the performance PLMS for each part as:

$$PerformancePLMS = 100 - \frac{P_{LOL} + 100}{P_{Specified}}. \qquad \text{Equation 7}$$

For example, where a drive is specified to operate workloads at a given IOPS level ($IOPS_{specified}$), a workload loss-of-life ($W_{LOL}$) can be given as:

$$W_{LOL} = IOPS_{Specified} - \frac{IOP_{Actual}}{t_{Operation}}. \qquad \text{Equation 8}$$

where $IOP_{Actual}$ is the sum total of I/O operations performed by the part, and $t_{Operation}$ is the total time of operation. Part life management module 308 then generates the workload PLMS for each part as:

$$WorkloadPLMS = 100 - \frac{W_{LOL} + 100}{IOPS_{Specified}}. \qquad \text{Equation 9}$$

Datacenter management zone correlator 310 operates to roll up the individual component PLMS to identify poor part health zones of the datacenter. At a first level, datacenter management zone correlator 310 determines a distinction between installed components of information handling system 220 that are in service versus installed components of the information handling system that are not in service. For example, one or more of GPUs 224 may be held in reserve or otherwise powered down for power management purposes, or the like. Datacenter management zone correlator 310 then determines an information handling system PLMS ($PLMS_{IHS}$) for information handling system 220 and for all other equipment in datacenter 200. In a particular embodiment, the information handling system PLMS for a given piece of equipment is determined as the average of the PLMS for all of the in-service installed components in the piece of equipment. In another embodiment, the information handling system PLMS for a given piece of equipment is determined as the worst case PLMS among the in-service installed component in the piece of equipment.

At a next level, datacenter management zone correlator 310 determines a server rack PLMS ($PLMS_{Rack}$) for each of the server racks of datacenter 200. Here, the server rack PLMS is determined as the average of the information handling system PLMS of each piece of equipment installed in a particular server rack. Similarly, datacenter management zone correlator 310 determines an aisle PLMS ($PLMS_{Aisle}$) for each aisle of datacenter 200. Here, the aisle PLMS is determined as the average of the rack PLMS of each server rack in a particular aisle. Next, datacenter management zone correlator 310 determines a datacenter PLMS ($PLMS_{Datacenter}$) for datacenter 200. Here, the datacenter PLMS is determined as the average of the aisle PLMS of each aisle in datacenter 200. Finally, having rolled up the datacenter PLMS for datacenter 200, datacenter management zone correlator 310 operates to identify information handling systems, server racks, or aisles within datacenter 200 that are experiencing a poor PLMS. Here, datacenter management zone correlator 310 provides a PLMS threshold, such as 15%. Then, if any particular information handling system, server rack, or aisle PLMS falls below the PLMS threshold, then datacenter management zone correlator 310 provides an indication that the particular information handling system, server rack, or aisle is experiencing poor part life.

PLMS analyzer 312 operates to correlate the poor health zones as determined by datacenter management zone correlator 310 with environmental conditions, usage, and workloads of the components, and to identify risk factors within datacenter 200 that are contributing to poor component health. In particular, PLMS analyzer 312 operates to receive the environmental, usage, and workload information for datacenter 200 on a periodic basis, such as once a day, once a week, or the like, and to receive the zone correlated PLMS from datacenter management zone correlator 310. PLMS analyzer 312 then determines a rate of change for the environmental, using, and workload information based upon each of the zones. That is, PLMS analyzer 312 determines a rate of change for each information handling system, for each server rack, for each aisle, and for the datacenter. PLMS analyzer 312 further determines the rate of change of each of the zone correlated PLMS. PLMS analyzer 312 compares the zone correlated factors rate of change with each associated zone correlated PLMS to determine if the rates of change are in agreement.

If not, then PLMS analyzer 312 provides an indication that an uncorrelated excursion event has occurred and a datacenter administrator can issue a trouble ticket to determine the cause of the excursion. On the other hand, when the zone correlated factors rate of change is in agreement with the associated zone correlated PLMS, then PLSM analyzer 312 provides an indication to datacenter management system 230 that the zone correlated PLMS are operating as expected based upon the zone correlated factors. Here, when datacenter management zone correlator 310 indicates that a particular zone is experiencing poor part life, then a datacenter administrator can examine the operating conditions for the particular zone that is causing the reduction in part life in the zone, and can take management steps to correct the problem. For example, an administrator can take steps to alter the environment, the usage, or the workload of the elements in the particular zone that is experiencing the poor part life. Thus, when the poor part life is correlated to an environmental factor, such as a high temperature region of the datacenter, then the administrator can take steps to better regulate the temperature in the region. Or when the poor part life is correlated to a usage parameter, for example to an information handling system that is experiencing high CPU, GPU, memory, or storage usage, or high memory or I/O bandwidth, then the administrator can bring one or more spare information handling system on line to reduce the usage of the information handling system that is experiencing the poor part life. Finally, when the poor part life is correlated to a workload parameter, then the administrator can migrate the workload from the information handling system experiencing the poor part life to a different information handling system.

It will be understood that the functions and features of datacenter management system 230 and of part life manager 232, as described above may be performed by one or more information handling systems of datacenter 200, or by one or more information handling system that is remote from the datacenter. Moreover, the functions and features of part life manager 232 may be performed as a function of a BIOS of one or more of the information handling systems of datacenter 200, as a function of a BMC of one or more of the information handling systems of the datacenter, or as a function of another processor or controller of the datacenter, as needed or desired.

Figure 4:
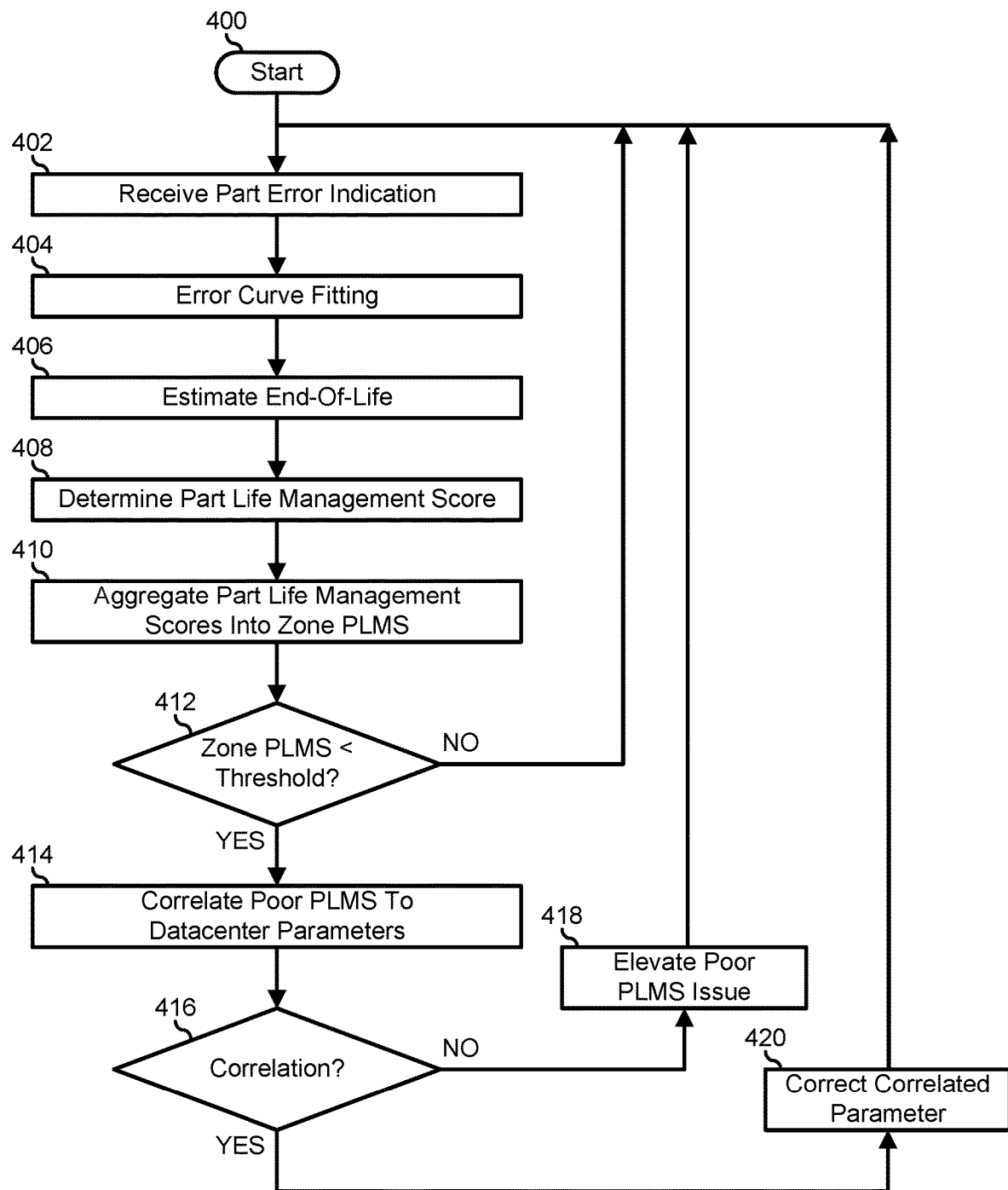
FIG. 4 is a flowchart of a method for managing parts in a datacenter according to an embodiment of the present disclosure.

FIG. 4 illustrates a method for managing parts in a datacenter, starting at block 400. Part error information for various parts or components of a datacenter are received by a part life manager in block 402. The part life manager performs a curve fitting to the error information to obtain a best fit of the received part error information for each part in block 404. For example, the curve fitting may be performed by error curve fitting module 304, as described above. An end-of-life estimate for each part is determined based upon the best fit curve from block 404 in block 406. For example, end-of-life estimator 306 can determine the individual end-of-life estimates for each part as described above.

The part life manager determines a PLMS for each part in block 406. For example, part life management module 308 can determine a loss-of-life and a PLMS for each part as described above. The part life manager aggregates the individual part PLMSs into zone level PLMSs in block 410. For example, datacenter management zone correlator 310 can aggregate the individual part PLMSs into information handling system PLMSs, server rack PLMSs, aisle PLMSs, and a datacenter PLMS as described above. A decision is made as to whether or not any of the zone PLMSs are below a PLMS threshold in decision block 412. If not, the "NO" branch of decision block 412 is taken and the method returns to block 402 where the part error information is received. If any of the zone PLMSs are below a PLMS threshold, the "YES" branch of decision block 412 is taken, and the zones with the poor PLMS are correlated to the datacenter operating parameters in block 414. For example, datacenter management zone correlator 310 can determine if the poor PLMS zones are correlated to the parameters of datacenter 200 as described above. A decision is made as to whether or not the poor PLMS zones correlate to datacenter operating parameters in decision block 416. If not, the "NO" branch of decision block 416 is taken and the poor PLMS zone is identified as having an uncorrelated loss of part life and an issue is logged with a datacenter administrator to determine a cause of the poor part life in block 418 and the method returns to block 402 where the part error information is received. If the poor PLMS zones correlate to datacenter operating parameters, the "YES" branch of decision block 416 is taken, the operating parameter that correlated with the poor part life is changed and the method returns to block 402 where the part error information is received.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of a datacenter for determining a component life score, the information handling system comprising:
   a hardware component configured to provide error indications associated with aging of the hardware component, the hardware component having a predefined error threshold and a predefined warranty duration; and
   a component life manager configured to:
      receive the error indications;
      fit the received error indications to a curve;
      determine an end of life estimate based upon the curve and the error threshold;
      determine an end of life date based upon the end of life estimate and a date that the first error indication is received;
      determine a loss of life based on the end of life estimate and the warranty duration;
      determine the component life score for the hardware component based upon the loss of life and the warranty duration;
      determine that the component life score for the hardware component is below a threshold;
      determine that an environmental condition of the datacenter is associated with the hardware component in response to determining that the component life score is below the threshold; and
      adjust the environmental condition of the datacenter in response to determining that the environmental condition of the datacenter is associated with the hardware component.

2. The information handling system of claim 1, wherein in fitting the received error indications to the curve, the component life manager performs a regression analysis to fit the received error to the form:

$$\#CE = Ae^{Bt} - C$$

where #CE represents a number of error indications received at a given time t, and where A, B, and C are terms that are derived via the regression analysis.

3. The information handling system of claim 2, wherein the component life manager determines the end of life estimate as:

$$t_{EOL} = \frac{\ln\left(\frac{\#CE_{Threshold} - C}{A}\right)}{B}$$

where $t_{EOL}$ is the end of life estimate and $\#CE_{Threshold}$ represents the error threshold.

4. The information handling system of claim 3, wherein the component life manager determines the end of life date as:

$$t_{Fail} = t_{Error} + t_{EOL}$$

where $t_{Fail}$ is the end of life date and $t_{Error}$ is date a first error indication is received.

5. The information handling system of claim 4, wherein the component life manager determines the loss of life as:

$$t_{LOL} = t_{Warranty} - t_{EOL}$$

where $t_{LOL}$ is the loss of life date and $t_{Warranty}$ is the warranty duration.

6. The information handling system of claim 5, wherein the component life manager determines the component life score as:

$$PLMS = 100 - \frac{t_{LOL} + 100}{t_{Warranty}}$$

where PLMS is the component life score.

7. The information handling system of claim 1, wherein the hardware component includes a dual in-line memory module (DIMM), and the error indications include correctable errors on the DIMM.

8. The information handling system of claim 1, wherein the hardware component includes a graphics processing unit (GPU), and the error indications include a retired page count.

9. The information handling system of claim 1, wherein the hardware component includes a data storage device, and the error indications include uncorrectable errors on the data storage device, an uncorrectable sector count on the data storage device, and a reallocated sector count on the data storage device.

10. The information handling system of claim 1, wherein the hardware component includes a network interface card (NIC), and the error indications include a lost packet count.

11. A method for determining a component life score for a component of an information handling system, the component configured to provide error indications associated with aging of the component, and the component having a predefined error threshold and a predefined warranty duration, the method comprising:
receiving, by a component life manager, the error indications;
fitting the received error indications to a curve;
determining an end of life estimate based upon the curve and the error threshold;
determining an end of life date based upon the end of life estimate and a date that the first error indication is received;
determining a loss of life based on the end of life estimate and the warranty duration;
determining the component life score for the component based upon the loss of life and the warranty duration;
determining that the component life score for the component is below a threshold;
determining that an environmental condition of the datacenter is associated with the component in response to determining that the component life score is below the threshold; and
adjusting the environmental condition of the datacenter in response to determining that the environmental condition of the datacenter is associated with the component.

12. The method of claim 11, wherein the curve is of the form:

$$\#CE = Ae^{Bt} - C$$

where #CE represents a number of error indications received at a given time t, and where A, B, and C are terms that are derived via the regression analysis.

13. The method of claim 12, wherein the life estimate is of the form:

$$t_{EOL} = \frac{\ln\left(\frac{\#CE_{Threshold} - C}{A}\right)}{B}$$

where $t_{EOL}$ is the end of life estimate and $\#CE_{Threshold}$ represents the error threshold.

14. The method of claim 13, wherein the end of life date is of the form:

$$t_{Fail} = t_{Error} + t_{EOL}$$

where $t_{Fail}$ is the end of life date and $t_{Error}$ is a date a first error indication is received.

15. The method of claim 14, wherein the loss of life is of the form:

$$t_{LOL} = t_{Warranty} - t_{EOL}$$

where $t_{LOL}$ is the loss of life date and $t_{Warranty}$ is the warranty duration.

16. The method of claim 15, wherein the component life score is of the form:

$$PLMS = 100 - \frac{t_{LOL} + 100}{t_{Warranty}}$$

where PLMS is the component life score.

17. The method of claim 11, wherein the component includes a dual in-line memory module (DIMM), and the error indications include correctable errors on the DIMM.

18. The method of claim 11, wherein the component includes a graphics processing unit (GPU), and the error indications include a retired page count.

19. The method of claim 11, wherein the component includes a data storage device, and the error indications include uncorrectable errors on the data storage device, an uncorrectable sector count on the data storage device, and a reallocated sector count on the data storage device.

20. An information handling system for determining a component life score for a dual in-line memory module (DIMM) of the information handling system, the information handling system comprising:
the DIMM, wherein the DIMM is configured to provide uncorrectable error indications associated with aging of the DIMM, the DIMM having a predefined error threshold and a predefined warranty duration; and
a DIMM life manager configured to:
receive the error indications;
fit the received error indications to a curve;
determine an end of life estimate based upon the curve and the error threshold;
determine an end of life date based upon the end of life estimate and a date that the first error indication is received;
determine a loss of life based on the end of life estimate and the warranty duration;
determine the component life score based upon the loss of life and the warranty duration;
determine that the component life score for the component is below a threshold;
determine that an environmental condition of the datacenter is associated with the component in response to determining that the component life score is below the threshold; and
adjust the environmental condition of the datacenter in response to determining that the environmental condition of the datacenter is associated with the component.

* * * * *